(12) United States Patent
Silvery et al.

(10) Patent No.: US 12,388,303 B2
(45) Date of Patent: Aug. 12, 2025

(54) MECHANICAL CONNECTION UNIT, STATOR AND ELECTRIC MACHINE

(71) Applicant: Schaeffler Technologies AG & Co. KG, Herzogenaurach (DE)

(72) Inventors: Christian Silvery, Walzbachtal (DE); Robert Maier, Gernsbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 217 days.

(21) Appl. No.: 18/037,807

(22) PCT Filed: Oct. 22, 2021

(86) PCT No.: PCT/DE2021/100848
§ 371 (c)(1),
(2) Date: May 19, 2023

(87) PCT Pub. No.: WO2022/105957
PCT Pub. Date: May 27, 2022

(65) Prior Publication Data
US 2023/0421004 A1 Dec. 28, 2023

(30) Foreign Application Priority Data
Nov. 19, 2020 (DE) .......................... 102020130615.6

(51) Int. Cl.
*H02K 1/18* (2006.01)
*H02K 7/00* (2006.01)
*H02K 11/25* (2016.01)

(52) U.S. Cl.
CPC ............... *H02K 1/18* (2013.01); *H02K 7/006* (2013.01); *H02K 11/25* (2016.01)

(58) Field of Classification Search
CPC .......... H02K 1/18; H02K 11/25; H02K 7/006
USPC .................................................. 310/68 R, 71
See application file for complete search history.

(56) References Cited

U.S. PATENT DOCUMENTS

2017/0110929 A1   4/2017   Egami et al.

FOREIGN PATENT DOCUMENTS

| DE | 102008007409 A1 | 8/2009 | |
|----|----|----|----|
| DE | 112015001426 T5 | 12/2016 | |
| DE | 102016215553 A1 * | 2/2018 | .............. H02K 5/225 |
| EP | 2690758 A2 * | 1/2014 | .............. H02K 3/522 |
| EP | 3480927 A1 * | 5/2019 | .............. H02K 1/18 |
| WO | 2014174996 A1 | 10/2014 | |
| WO | 2019097992 A1 | 5/2019 | |

* cited by examiner

*Primary Examiner* — Jose A Gonzalez Quinones
(74) *Attorney, Agent, or Firm* — Volpe Koenig

(57) ABSTRACT

A mechanical connection unit for fastening an electrical coupling element to an interconnection ring of an electric machine. The connection unit includes a fixing component, which can be interlockingly and/or frictionally positioned on the interconnection ring, and a receiving component, which is rotatably mounted on the fixing component and is provided for releasably fixing the electrical coupling element. The receiving component can be rotated from a first position to a second position for removal of the electrical coupling element.

20 Claims, 6 Drawing Sheets

MECHANICAL CONNECTION UNIT, STATOR AND ELECTRIC MACHINE

CROSS-REFERENCE TO RELATED APPLICATIONS

This application is the U.S. National Phase of PCT Appln. No. PCT/DE2021/100848, filed Oct. 22, 2021, which claims the benefit of German Patent Appln. No. 102020130615.6, filed Nov. 19, 2020, the entire disclosures of which are incorporated by reference herein.

TECHNICAL FIELD

The present disclosure relates to a mechanical connection unit for fastening an electrical coupling element to an interconnection ring of an electric machine. The disclosure further relates to a stator and an electric machine.

BACKGROUND

Electric motors are increasingly being used to drive motor vehicles in order to create alternatives to internal combustion engines that require fossil fuels. Significant efforts have already been made to improve the suitability of electric drives for everyday use and also to be able to offer users the driving comfort they are accustomed to.

A detailed description of an electric drive can be found in an article in the ATZ magazine, Volume 113, May/2011, pages 360-365 by Erik Schneider, Frank Fickl, Bemd Cebulski and Jens Liebold with the title: *Hochintegrativ und Flexibel Elektrische Antriebseinheit für E-Fahrzeuge* [Highly Integrative and Flexible Electric Drive Unit for E-Vehicles]. This article describes a drive unit for an axle of a vehicle, which comprises an electric motor that is arranged concentrically and coaxially with a bevel gear differential, wherein a switchable 2-speed planetary gear set is arranged in the drive train between the electric motor and the bevel gear differential, which is also is positioned coaxially to the electric motor or the bevel gear differential or spur gear differential. The drive unit is very compact and allows a good compromise between climbing ability, acceleration and energy consumption due to the switchable 2-speed planetary gear set. Such drive units are also referred to as e-axles or electrically operable drive trains.

In addition to purely electrically powered drive trains, hybrid drive trains are also known. Such drive trains of a hybrid vehicle usually comprise a combination of an internal combustion engine and an electric motor, and enable—for example in urban areas—a purely electric mode of operation with both sufficient range and availability, in particular when driving overland. In addition, there is the possibility of driving the internal combustion engine and the electric motor at the same time in certain operating situations.

In an electric machine of this type, as used in fully electric or hybrid drive trains of a motor vehicle, the interconnection of the individual windings distributed around the circumference can be implemented, for example, by means of an interconnection ring or a plurality of interconnection rings. Here, busbars usually made of copper can be arranged on or in a common carrier ring or separate carrier rings made of plastic. On occasion, this type of interconnection ring has also been referred to as a "switching ring" or "contact bridge". Interconnection rings of this type are usually placed axially on the winding package.

DE102008007409A1 describes, for example, a three-part switching ring for a stator, wherein three busbars and a star point ring are arranged in one plane, lying flat next to one another in a carrier ring made of a temperature-resistant plastic. The contact points of the busbars and the star point ring project from the carrier ring and are connected to the wire ends of the partial windings of the stator.

Temperature sensors are often integrated into the electric machine for better power control. In this case, the temperature sensor must be connected to an engine or vehicle control system via an electrical coupling element such as a plug. However, such a plug can neither be safely stored nor held in a defined manner in an electric machine during transport from supplier to customer, consequently this plug hangs freely movable outside the electric machine during transport or assembly. This poses a risk of damage to the electrical lines connected to the plug, the plug itself or surrounding components.

SUMMARY

It is thus the object of the disclosure to provide a means for fastening an electrical coupling element in or on an electric machine. It is further the object of the disclosure to provide an improved stator as well as an improved electric machine.

This object is achieved by a mechanical connection unit for fastening an electrical coupling element to an interconnection ring of an electric machine, wherein the connection unit comprises a fixing means, which can be interlockingly and/or frictionally positioned on the interconnection ring, and has a receiving means, which is rotatably arranged on the fixing means and is provided for releasably fixing the electrical coupling element, so that the receiving means can be rotated from a first position to a second position for removal of the electrical coupling element.

This mechanical connection unit according to the disclosure makes it possible to secure an electrical coupling element to an interconnection ring and then, when the electric machine has been installed, to remove it simply and easily from the installed position without any further aids and in an ergonomically favorable manner and to connect it, for example, to an engine or vehicle control system. Furthermore, the electrical coupling element can be secured in a transport position during transport to counteract possible damage during transport.

An electrical coupling element has the function of establishing an electrically conductive contact with a corresponding second electrical coupling element. The electrical coupling element can be configured such that the electrically conductive contact is designed to be releasable or non-releasable. Particularly preferred is an electrical coupling element selected from the group of plugs, sockets and/or couplings. The electrical coupling element can comprise contact pins facing inward or outward.

The mechanical connection unit comprises a fixing means and a receiving means which is rotatably arranged on the fixing means. The rotatability of the two components relative to one another can be provided, for example, by means of a corresponding rotary bearing. In a preferred embodiment, the fixing means or receiving means has a cylindrical shaft which is rotatably mounted in a corresponding shaft opening of the corresponding component. The bearing is preferably designed such that the receiving means is arranged on the fixing means such that it cannot be lost. For this purpose, the shaft can, for example, have snap-locking means which, after the shaft has been passed through the corresponding shaft opening, form an interlocking in the axial direction with respect to the shaft. Both the fixing means and the receiving means are preferably made of a plastic.

The rotatability of the receiving means relative to the fixing means allows the receiving means to be moved back and forth between two positions. In particular, it is preferred that the receiving means can be moved to a first parking position, which can be assumed, for example, during transport of the electric machine, so that the receiving means or the electrical coupling element is protected from possible mechanical influences during transport and is arranged such that it cannot be lost. It is particularly preferred that the receiving means is releasably engaged in the first position relative to the fixing means. For this purpose, corresponding releasable interlocking means can be formed on the receiving means and the fixing means.

According to an advantageous embodiment of the disclosure, the receiving means can be rotatable relative to the fixing means through an angular range between 0°-180°, preferably 0°-120°, particularly preferably 0°-90°, so that an ergonomically favorable and assembly-friendly design of the mechanical connection unit can be provided. It can also be advantageous to further develop the disclosure such that the second position for removing the electrical coupling element extends in a radial direction to the interconnection ring, thereby enabling a particularly ergonomically favorable removal of the electrical coupling element.

It can also be provided, according to a further preferred development of the disclosure, that the electrical coupling element has at least one electrical conductor which connects the coupling element to an electrical component of the electric machine. Furthermore, according to a likewise advantageous embodiment of the disclosure, the electrical component can be a temperature sensor. Of course, it is also conceivable to connect other electrical components, in particular other sensors, to the electrical coupling element in an electrically conductive manner.

According to a further particularly preferred embodiment of the disclosure, the electrical coupling element can have first interlocking means and the receiving means can have second interlocking means, wherein the first interlocking means and the second interlocking means are configured such that the electrical coupling element can be translationally inserted into and translationally removed from the receiving means.

This has the particular effect of providing an assembly-friendly and ergonomically favorable mechanical connection unit.

Furthermore, the disclosure can also be further developed in that the receiving means has a grip section which, when the electrical coupling element is inserted in the receiving means, provides a two-sided gripping surface for a user. This can also further improve the ease of assembly.

In a likewise preferred embodiment of the disclosure, the fixing means can have resiliently pivotable latching hooks which form a snap-lock connection with the interconnection ring, so that the fixing means can be clipped onto the interconnection ring in an assembly-friendly manner.

The object of the disclosure is further achieved by a stator for an electric machine having an interconnection ring, wherein a connection unit is provided for fastening an electrical coupling element to the interconnection ring of the electric machine according to one of claims 1-8.

Finally, the object of the disclosure is also achieved by an electric machine having a stator and a rotor, in particular for a drive train of a motor vehicle, wherein the stator is designed according to claim 9.

BRIEF DESCRIPTION OF THE DRAWINGS

The disclosure will be explained in more detail below with reference to figures without limiting the general concept of the disclosure.

In the figures.

DETAILED DESCRIPTION

Figure 1:
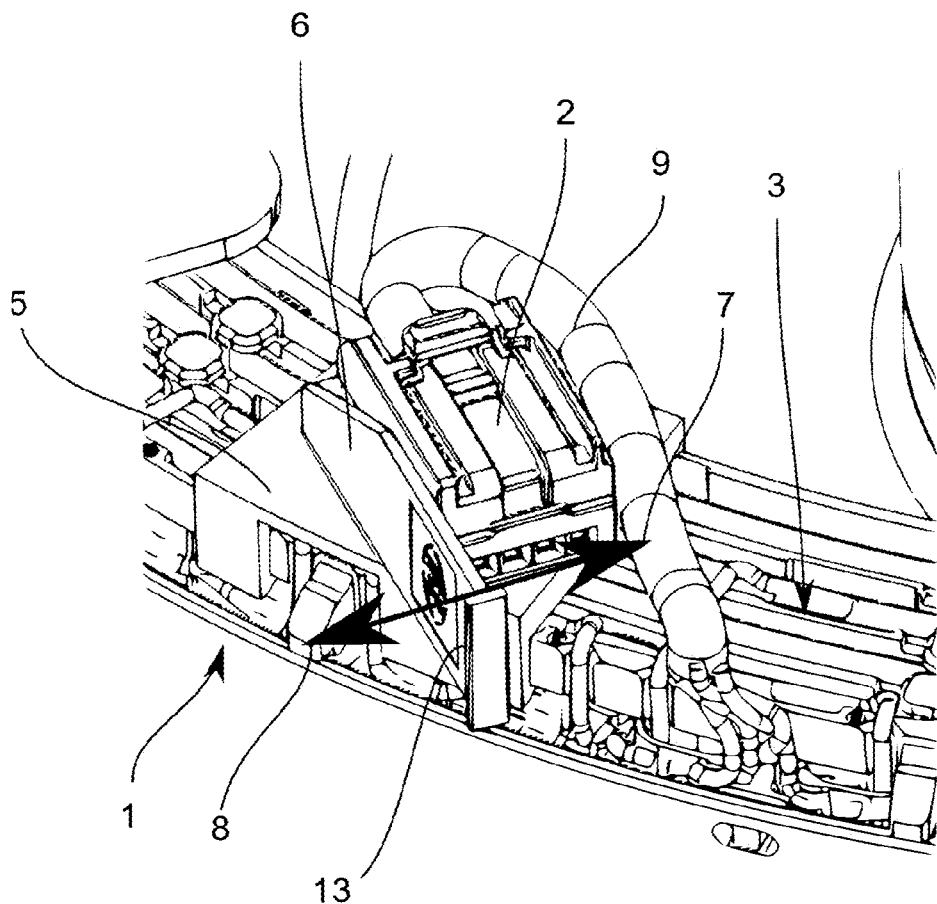
FIG. 1 shows a mechanical connection unit in a perspective view.
Figure 6:
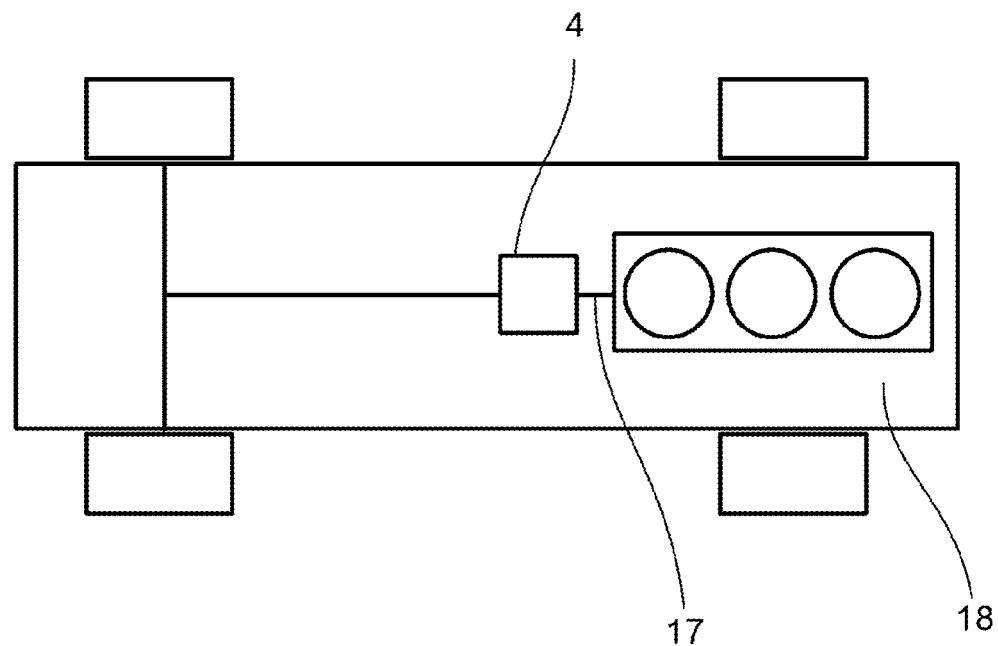
FIG. 6 shows a motor vehicle with a fully electric and hybridized drive train in a block diagram view.
Figure 6:
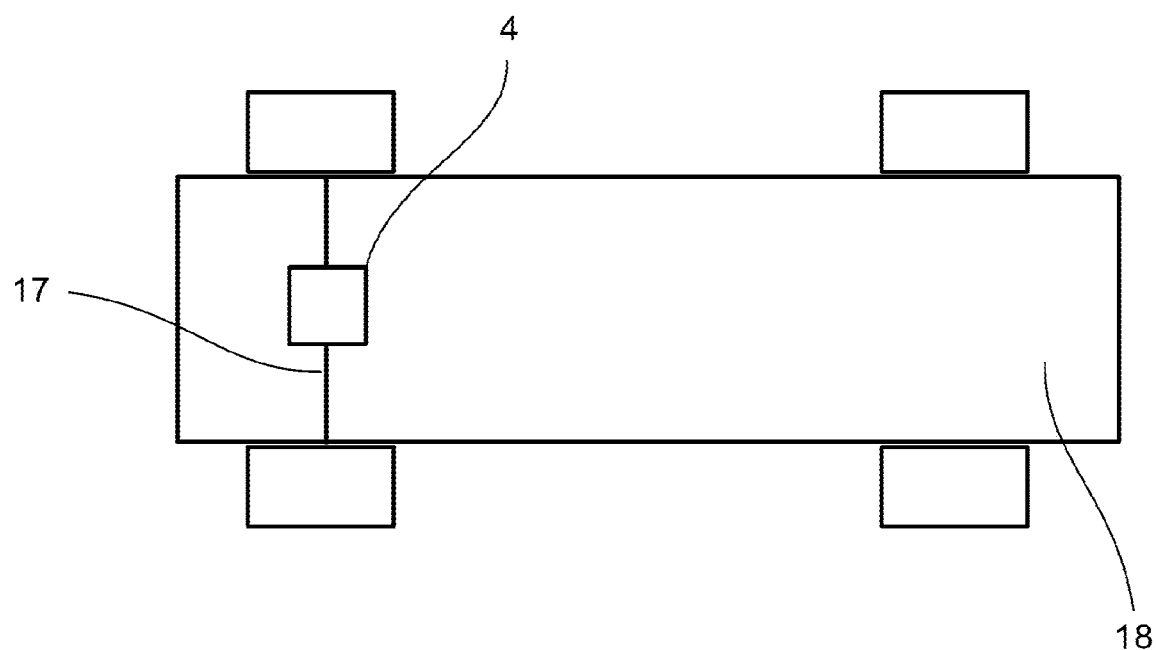

FIG. 1 shows a mechanical connection unit 1 for fastening an electrical coupling element 2 to an interconnection ring 3 of an electric machine 4, as used, for example, in fully electric or hybridized drive trains 17 of motor vehicles 18—as shown by way of example in FIG. 6.

The mechanical connection unit 1 comprises a clamp-like fixing means 5, which can be interlockingly and/or frictionally positioned on the interconnection ring 3. It further has a receiving means 6, which is rotatably arranged on the fixing means 5 and is provided for releasably fixing the electrical coupling element 2, so that the receiving means 6 can be rotated from a first position 7 to a second position 8 for removal of the electrical coupling element 2, which is indicated by the arrow in FIG. 1.

In the exemplary embodiment shown, the receiving means 6 is rotatable relative to the fixing means 5 through an angular range between the first position 7 and the second position 8 of 0°-90°. The second position 8 for removing the electrical coupling element 2 extends in a radial direction to the interconnection ring 3, which is shown in FIG. 2.

Figure 2:
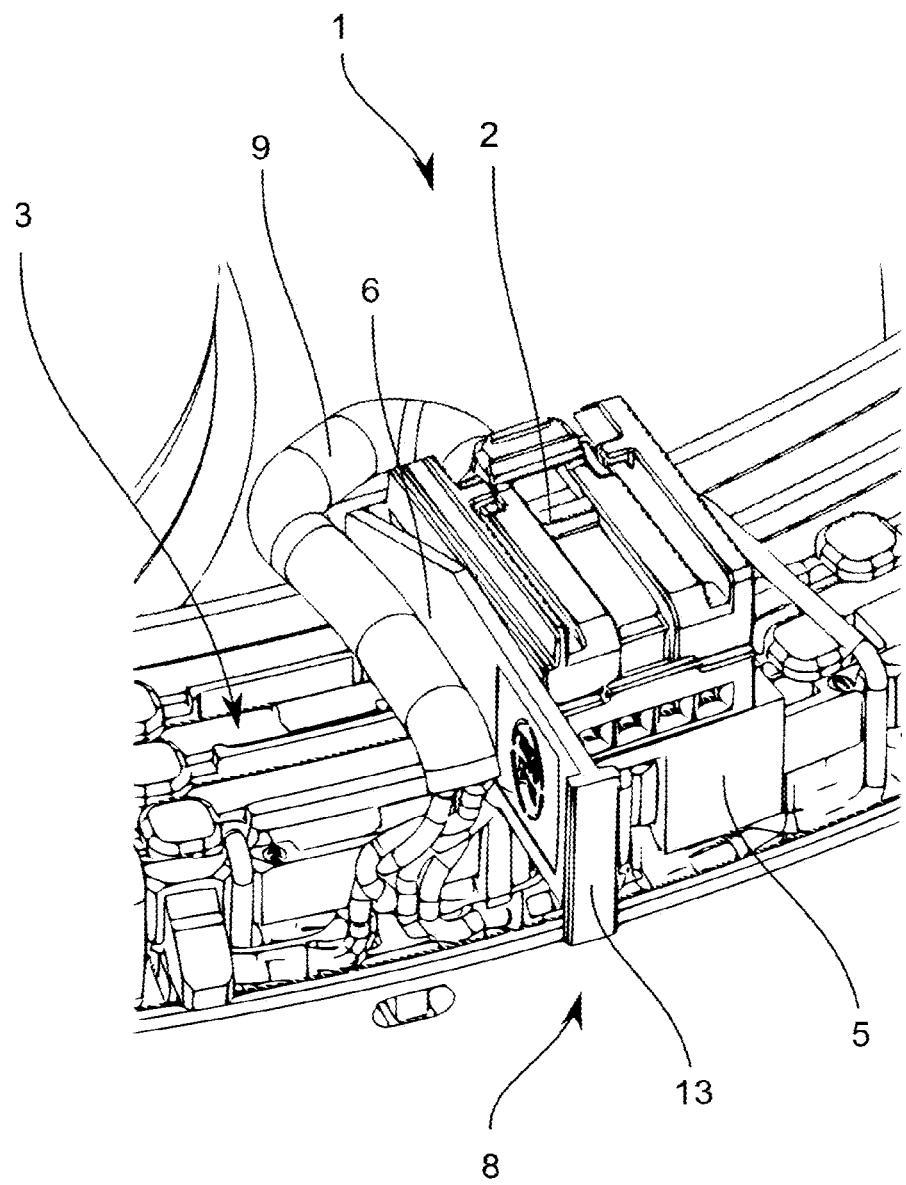
FIG. 2 shows a mechanical connection unit with a receiving means in its second position in a perspective view.

It is also readily apparent, particularly from FIGS. 1-2, that the receiving means 6 has a grip section 13 which, when the electrical coupling element 2 is inserted in the receiving means 6, provides a two-sided gripping surface 13 for a user. This allows the receiving means 6 to be gripped and rotated in an ergonomically favorable manner. In the exemplary embodiment shown, the gripping surface 13 is formed to be plate-like and extends in the axial direction as well as in the circumferential direction with respect to the stator. The gripping surface 13 provides a larger area for gripping the mechanical connection unit 1 with one hand and removing it from the electric machine 4 or rotating the receiving means 6.

Figure 3:
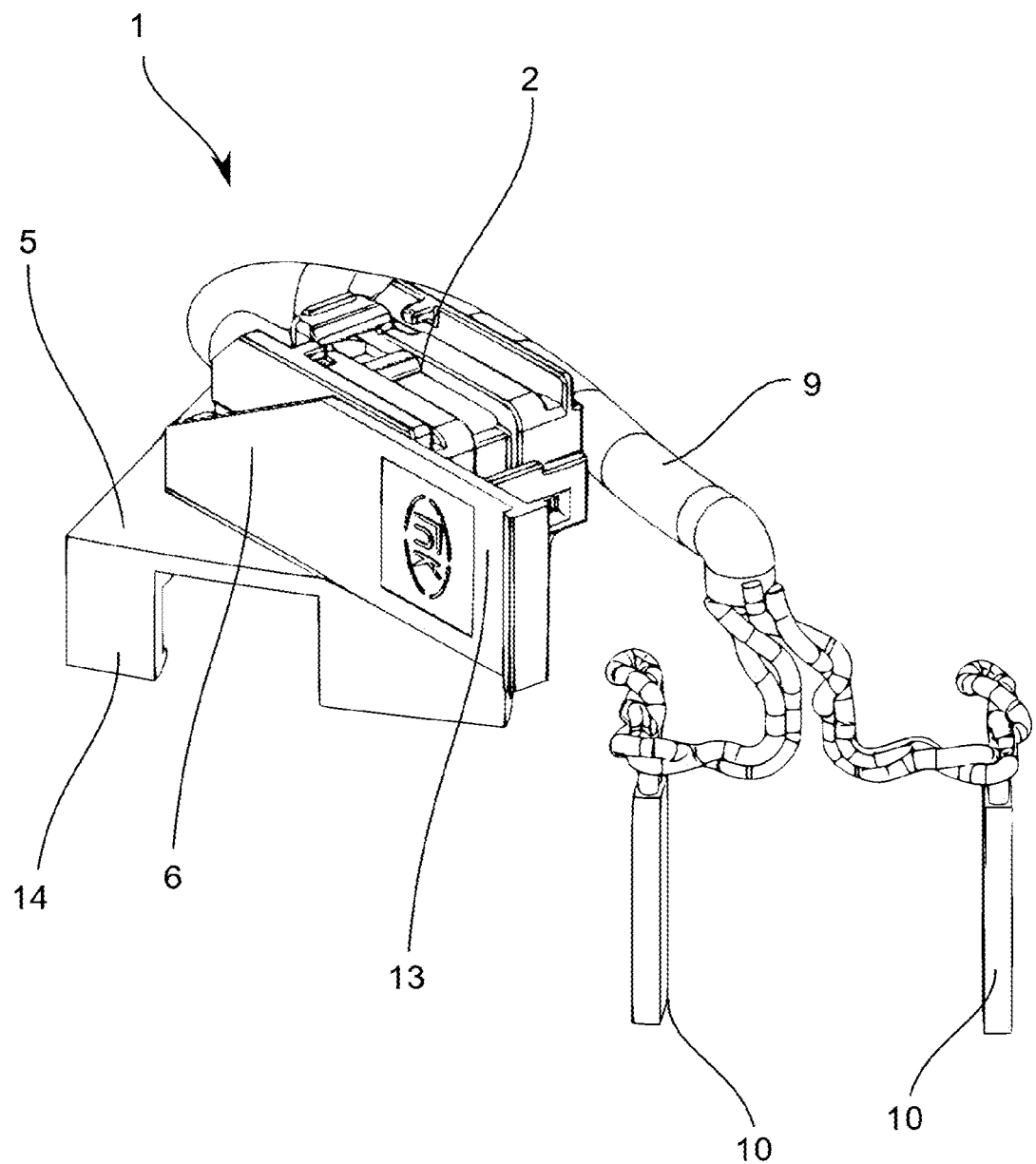
FIG. 3 shows a mechanical connection unit with a temperature sensor.

The electrical coupling element 2, which is designed as a plug, has an electrical conductor 9 which connects the coupling element 2 to an electrical component of the electric machine 4. As shown in FIG. 3, the electrical component is a temperature sensor 10. The temperature sensor 10 can be designed, for example, as an NTC or PTC resistance element.

What can also be inferred from FIG. 3 is that the clamp-like fixing means 5 have resiliently pivotable latching hooks 14 which form a snap-lock connection with the interconnection ring 3. In this way, the fixing means 5 can be clipped onto the interconnection ring 4 in an assembly-friendly manner and such that it cannot be lost. The fixing means 5 can have further interlocking means which provide complete fixing of the fixing means 5 with or without play in all spatial directions relative to the interconnection ring 4.

Figure 4:
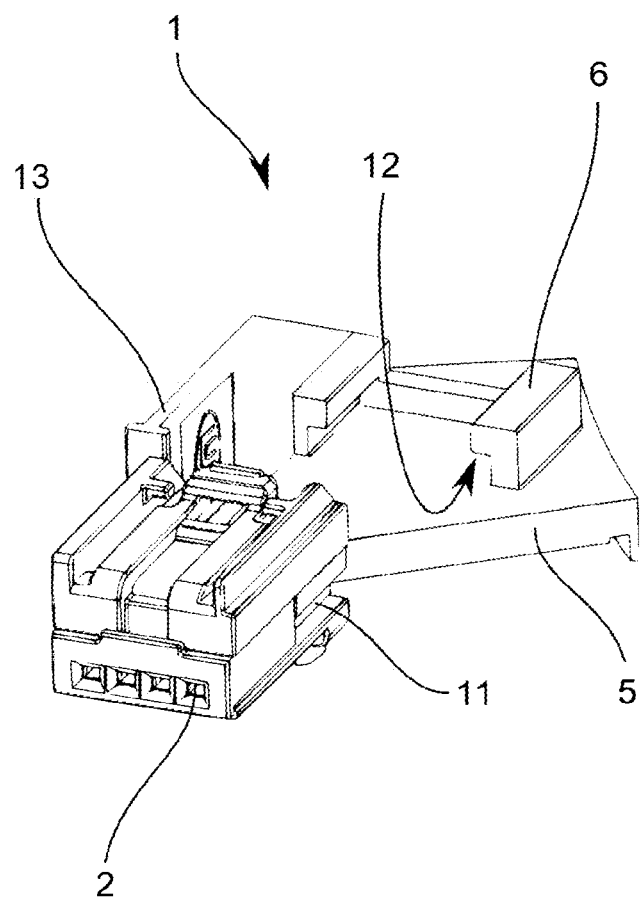
FIG. 4 shows a mechanical connection unit in an exploded view.

FIG. 4 shows that the electrical coupling element 2 has first interlocking means 11 and the receiving means 6 has second interlocking means 12, wherein the first interlocking means 11 and the second interlocking means 12 are configured such that the electrical coupling element 2 can be translationally inserted into and translationally removed from the receiving means 6.

The electrical coupling element 2 shown in FIG. 4 and designed as a plug has two lateral guide grooves as first interlocking means 11. These are used for a form-fit of the electrical coupling element 2 with the receiving means 6. This has two opposing L-shaped second interlocking means 12 into which the guide grooves of the electrical coupling element 2 can be translationally pushed. In addition, a releasable latching of the electrical coupling element 2 in the receiving means 6 can be provided here for securing the electrical coupling element 2 in a predefined transport position.

As can be seen from FIGS. 1-4, the electrical coupling element 2 can be assembled or disassembled from different directions. On the one hand, it is possible for the electrical coupling element 2 to be removable from the receiving means 6 in a radially outward direction, as can be seen in particular from FIG. 2. After removal, the mechanical connection unit 1 can remain on or be removed from the interconnection ring 3. On the other hand, however, it is also possible for the electrical coupling element 2 to be removable from the receiving means 6 in a tangential outward direction, as shown for example in FIG. 1.

Figure 5:
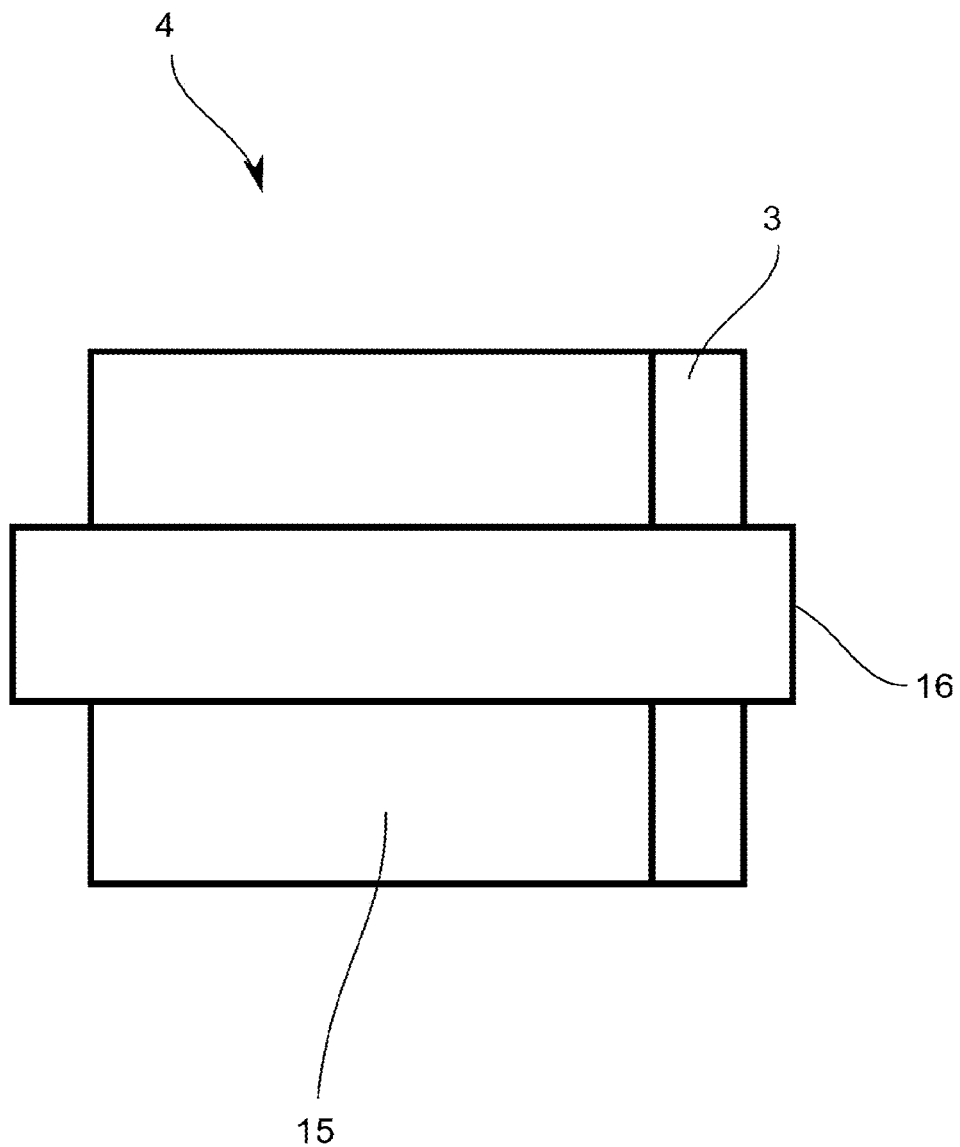
FIG. 5 shows an electric machine with an interconnection ring in a schematic view.

The connection unit 1 of FIGS. 1-4 is provided in particular for fastening an electrical coupling element 2 to the interconnection ring 3 of an electric machine 4, as shown by way of example in FIG. 5.

The disclosure is not limited to the embodiments shown in the figures.

The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SIGNS

1 Mechanical connection unit
2 Coupling element
3 Interconnection ring
4 Electric machine
5 Fixing means
6 Receiving means
7 First position
8 Second position
9 Electrical conductor
10 Temperature sensor
11 First interlocking means
12 Second interlocking means
13 Grip section
14 Latching hook
15 Stator
16 Rotor
17 Drive train
18 Motor vehicle

The invention claimed is:

1. A mechanical connection unit for fastening an electrical coupling element to an interconnection ring of an electric machine, the connection unit comprising:
  a fixing component, the fixing component being at least one of interlockingly or frictionally positioned on the interconnection ring, and a receiving component rotatably arranged on the fixing component for releasably fixing the electrical coupling element, so that the receiving component can be rotated about an axis extending parallel to an axial direction of the electric machine from a first position to a second position for removal of the electrical coupling element.

2. The mechanical connection unit according to claim 1, wherein the receiving component is rotatable relative to the fixing component through an angular range between 0°-180°, preferably 0°-120°, particularly preferably 0°-90°.

3. The mechanical connection unit according to claim 1, wherein the electrical coupling element has at least one electrical conductor which connects the coupling element to an electrical component of the electric machine.

4. The mechanical connection unit according to claim 3, wherein the electrical component is a temperature sensor.

5. The mechanical connection unit according to claim 1, wherein the electrical coupling element has a first interlocking component and the receiving component has a second interlocking component, wherein the first interlocking component and the second interlocking component are configured such that the electrical coupling element can be translationally inserted into and translationally removed from the receiving component.

6. The mechanical connection unit according to claim 1, wherein the receiving component has a grip section which, when the electrical coupling element is inserted in the receiving component, provides a two-sided gripping surface for a user.

7. The mechanical connection unit according to claim 1, wherein the fixing component has resiliently pivotable latching hooks which form a snap-lock connection with the interconnection ring.

8. The mechanical connection unit according to claim 1, wherein the second position for removing the electrical coupling element extends in a radial direction to the interconnection ring.

9. A stator for an electric machine having an interconnection ring, comprising:
  a mechanical connection unit for fastening an electrical coupling element to the interconnection ring, the connection unit including a fixing component, the fixing component being at least one of interlockingly or frictionally positioned on the interconnection ring, and a receiving component rotatably arranged on the fixing component for releasably fixing the electrical coupling element, so that the receiving component can be rotated about an axis extending parallel to an axial direction of the electric machine from a first position to a second position for removal of the electrical coupling element.

10. An electric machine for a drivetrain of a motor vehicle comprising:
  a stator, and a rotor;
  wherein the stator includes an interconnection ring, and a mechanical connection unit for fastening an electrical coupling element to the interconnection ring, the connection unit including a fixing component, the fixing component being at least one of interlockingly or frictionally positioned on the interconnection ring, and a receiving component rotatably arranged on the fixing component for releasably fixing the electrical coupling element, so that the receiving component can be rotated about an axis extending parallel to an axial direction of the electric machine from a first position to a second position for removal of the electrical coupling element.

11. The stator according to claim 9, wherein the receiving component is rotatable relative to the fixing component through an angular range between 0°-180°, preferably 0°-120°, particularly preferably 0°-90°.

12. The stator according to claim 9, wherein the electrical coupling element has at least one electrical conductor which connects the coupling element to an electrical component of the electric machine.

13. The stator according to claim 12, wherein the electrical component is a temperature sensor.

14. The stator according to claim 9, wherein the electrical coupling element has a first interlocking component and the receiving component has a second interlocking component, wherein the first interlocking component and the second interlocking component are configured such that the electrical coupling element can be translationally inserted into and translationally removed from the receiving component.

15. The stator according to claim 9, wherein the receiving component has a grip section which, when the electrical coupling element is inserted in the receiving means component, provides a two-sided gripping surface for a user.

16. An electric machine according to claim 10, wherein the receiving component is rotatable relative to the fixing component through an angular range between 0°-180°, preferably 0°-120°, particularly preferably 0°-90°.

17. An electric machine according to claim 10, wherein the electrical coupling element has at least one electrical conductor which connects the coupling element to an electrical component of the electric machine.

18. An electric machine according to claim 17, wherein the electrical component is a temperature sensor.

19. An electric machine according to claim 10, wherein the electrical coupling element has a first interlocking component and the receiving component has a second interlocking component, wherein the first interlocking component and the second interlocking component are configured such that the electrical coupling element can be translationally inserted into and translationally removed from the receiving component.

20. An electric machine according to claim 10, wherein the receiving component has a grip section which, when the electrical coupling element is inserted in the receiving means component, provides a two-sided gripping surface for a user.

* * * * *